United States Patent [19]

Aishima et al.

[11] 4,094,997

[45] June 13, 1978

[54] BEEF FLAVOR SUBSTANCE, PROCESS FOR PRODUCING SAME AND BEEF-FLAVORING AGENT

[75] Inventors: Tetsuo Aishima; Akio Nobuhara, both of Kasukabe, Japan

[73] Assignee: Kikkoman Shoyu Co., Ltd., Noda, Japan

[21] Appl. No.: 776,367

[22] Filed: Mar. 10, 1977

[30] Foreign Application Priority Data

Mar. 12, 1976 Japan .................................. 51-26119

[51] Int. Cl.² .......................................... A23L 1/238
[52] U.S. Cl. ................................................... 426/533
[58] Field of Search ....................... 426/533, 534, 475

[56] References Cited

U.S. PATENT DOCUMENTS 3,394,015   7/1968   Giacino ................................ 426/533

FOREIGN PATENT DOCUMENTS 45-26051   12/1967   Japan .................................... 426/533

Primary Examiner—Raymond N. Jones
Assistant Examiner—Elizabeth A. Hatcher
Attorney, Agent, or Firm—Schuyler, Birch, Swindler, McKie & Beckett

[57] ABSTRACT

A beef flavor substance can be obtained by mixing an animal fat with a brewed soy sauce and heating the resulting mixture.

17 Claims, No Drawings

BEEF FLAVOR SUBSTANCE, PROCESS FOR PRODUCING SAME AND BEEF-FLAVORING AGENT

This invention relates to a novel beef flavor substance. More particularly, it relates to a beef flavor substance obtainable by mixing an animal fat with a brewed soy sauce followed by heating the resulting mixture, as well as to a process for producing same and to a beef-flavoring agent.

As the result of the recent Europeanization and diversification in the Japanese dietary life, there are growing demands in Japan for butcher's meat substitutes made from fish meat, wheat gluten or soybean protein as well as for drinks, foods, seasonings, spices and soup essences having meat-like flavor. However, this sort of products hitherto produced are poor in beef-like flavor as compared with cooked beef so that development of a substance capable of imparting a flavor of natural meat, particularly development of a beef-flavoring substance, has earnestly been desired by food-manufacturers.

In view of above, the present inventors have extensively studied with the aim of obtaining a substance capable of imparting a good natural meat flavor to substitutes for butcher's meat. As the result, it has been found that a substance having a flavor close to the natural beef flavor, particularly to the roast beef flavor, can be obtained by admixing an animal fat collected from domestic animals such as cattle, swine and sheep or other animals such as whale with a brewed soy sauce and then reacting the resulting mixture at elevated temperature. Based on this finding, this invention has been accomplished.

Thus it is an object of this invention to provide a beef flavor substance.

It is another object of this invention to provide a process for preparing a beef flavor substance.

It is a further object of this invention to provide a beef-flavoring agent.

Other objects and advantages of this invention will be apparent from the descriptions given below.

Heretofore, a few attempts were made to obtain a meat flavor from animal fats and acid- or enzymehydrolyzate of vegetable proteins. However, all the products obtained by these proposed processes were unsatisfactory as meat flavor because they were contaminated by caramel-odor or the disagreeable odor of heated beef tallow or lard.

Now, it is found that a product containing as large quantity of flavor quite close to the flavor of cooked meat, particularly to the roast beef flavor, can be obtained by mixing an animal fat with a brewed soy sauce and reacting the resulting mixture at elevated temperature.

Referring to an experimental example, this finding will be detailed below.

EXPERIMENTAL EXAMPLE 210 g of beef tallow was fused and heated at 160° C for 40 minutes while air was bubbled to stir the tallow. Then, it was divided into three portions A to C, each 70 g. Each of the portions A, B and C was independently mixed with 40 ml of koikuchi soy sauce (deep colored type of soy sauce), usukuchi soy sauce (thin colored type of soy sauce) or a 10% (w/w) solution of ribose in commercially available amino acid solution (which is a seasoning liquid prepared by hydrolizing a protein raw material, such as defatted soy beans or a wheat gluten, with hydrochloric acid thereby to isolate amino acids, neutralizing said acids with soda ash and then filtering solid materials), respectively. Each of the resulting mixtures was reacted under reflux at 160° C for 10 minutes while introducing air to stir it, after which it was cooled and kneaded thoroughly. Thus, three reaction products A, B and C were obtained.

Products A and B were subjected to organoleptic test according to the pair test method by a panel of twenty persons who had been trained so as to have a differentiating ability, while product C was used as a control for the test. The results obtained were as shown in Table 1.

Table 1

| Item Grouping | Comparison between A and C | | Result of statistical test |
|---|---|---|---|
| | No. of persons making choice of A | No. of persons making choice of C | |
| Agreeableness of meat flavor | 18 | 2 | ** |
| Strength of meat flavor | 17 | 3 | ** |

| Item Grouping | Comparison between B and C | | Result of statistical test |
|---|---|---|---|
| | No. of persons making choice of B | No. of persons making choice of C | |
| Agreeableness of meat flavor | 18 | 2 | ** |
| Strength of meat flavor | 18 | 2 | ** |

Note: The symbol ** means that there is a significant difference on a significant level of 1%.

As shown in Table 1, products A and B both produced by reacting beef tallow with brewed soy sauce at elevated temperature are far superior to product C obtained by reacting beef tallow with an amino acid solution containing a sugar in agreeableness and strength of meat flavor.

In another run of the experiment, the same organoleptic test as above was repeated except that the control was not C but an enzyme-hydrolyzate of wheat gluten (total nitrogen content 2.2%). In this run the results given were comparable to above.

In yet another run, products A and B were distilled together with ethanol under a reduced pressure in the manner described in Example 5 of this specification to obtain distillates A' and B', respectively. On the other hand, 200 g of minced beef was thoroughly roasted on a frying-pan, immediately transferred into a flask and distilled under reduced pressure together with ethanol in the same manner as above to obtain distillate D. Distillates A' and B' were subjected to an organoleptic test in comparison with distillate D, said organoleptic test being carried out by a panel of 20 trained persons having a differentiating ability. The results obtained were as shown in Table 2.

Table 2

| Item Grouping | Comparison between A' and D | | Result of statistical test |
|---|---|---|---|
| | No. of persons making choice of A' | No. of persons making choice of D | |
| Agreeableness of beef flavor | 9 | 11 | — |

| Grouping | Comparison between B' and D | | Result of statistical |
|---|---|---|---|
| | No. of persons making choice | No. of persons making choice | |

Table 2-continued

| Item | of B' | of D | test |
|---|---|---|---|
| Agreeableness of beef flavor | 8 | 12 | — |

Note: The symbol — denotes that there is no significant difference.

As shown in Table 2, A' and B' are substantially quite close to D, although they are somewhat inferior to the latter, so that there is no statistically significant difference between A' and D nor between B' and D.

According to this invention, an animal fat is mixed with a soy sauce and the resulting mixture is reacted at elevated temperature. The animal fat herein used is selected from the fats of domestic animals such as cattle, swine and sheep as well as other animals such as whale which may be refined or crude. Examples of said animal fat include beef tallow, lard, mutton tallow, goat tallow, whale tallow and the like.

The soy sauce to be mixed with the aforesaid animal fat according to this invention may be any soy sauces produced by the conventional brewering which comprises charging soy sauce yeast into salt water, fermenting the mixture, aging it, pressing it and finishing the filtrate. Examples of said soy sauce include brewed soy sauces such as koikuchi soy sauce (deep colored type of soy sauce), usukuchi soy sauce (thin colored type of soy sauce), shiro soy sauce (very thin colored type of soy sauce), sweet soy sauce (sweet type of soy sauce), tamari soy sauce (soy sauce produced by soy beans only) and the like; semi-chemical and semi-brewed soy sauces such as Shinshiki Nigo soy sauce (partly acid hydrolyzed and partly brewed soy sauce) and the like; mixtures of two or more kinds of soy sauces mentioned above; and solutions containing one of the above-mentioned soy sauces.

In practising this invention, aforesaid animal fat and brewed soy sauce are mixed together to give a mixture. Preferably, animal fat is used in a liquid form, though it may also be used in a solid form. If animal fat is used in a solid form, the fat and the soy sauce are homogeneously blended together by means of a stirring device such as kneader to give said mixture.

When animal fat is to be used in a liquid form, the animal fat which is solid initially is usually converted to a liquid in advance by keeping it at a temperature of 130° – 200° C, preferably 150° – 170° C, for 20 – 180 minutes, preferably 40 – 80 minutes. This procedure is preferably carried out under aerobic conditions realizable by, for example, introducing air or oxygen into the system to stir the latter. The introduction of air or oxygen is continued until the disagreeable odor characteristic of animal fats has disappeared almost completely at the elevated temperature and there arises an agreeable odor of heated fat in its place. Usually, air is introduced at a rate of 0.4 l/minute or more, preferably 0.8 – 6.0 l/minute, per 50 g of animal fat. If oxygen is introduced, a flow rate of oxygen about one third as much as the above-mentioned rate of air is enough for the purpose. Although animal fat may be fused in an open vessel, it is preferably fused in a vessel so constructed that the vapor evolved from the fat can be condensed and recycled into the vessel almost exhaustively by the aid of a cooler installed at the opening of the vessel (hereinafter, such combined operation of condensation and recycling is referred to as reflux).

Although the proportion of animal fat to soy sauce mixed therewith is somewhat dependent on the intended nature of the flavor, it is usual that 0.1 to 1.5 parts by weight, preferably 0.3 to 0.5 part by weight, of soy sauce is mixed with 1 part by weight of animal fat.

In the next step of the process, the mixture thus obtained is reacted at an elevated temperature. The reaction is carried out at 130° – 220° C, preferably 150° – 170° C, for a time period of 5 – 30 minutes, preferably 10 – 20 minutes. Similarly to the aforesaid fusion step, the reaction is also advisably carried out under aerobic conditions to produce a more excellent beef flavor. The reaction may be carried out in an open vessel or in a semi-closed type of vessel such as a vessel permitting reflux. If the reaction is carried out in an open vessel the resulting beef flavor is associated with a stronger scorched smell, while if the reaction is carried out in a semi-closed vessel under reflux the resulting beef flavor has a milder smell.

The reaction product thus obtained has a very good and intense meat-like flavor, particularly a flavor of roast beef, in itself. Therefore, it may directly be used as a meat-flavoring agent. However, more excellent beef-flavoring agents can be produced by distilling out the flavor substance from the reaction product. The distillate may be used directly, but it is also permitted to incorporate the distillate with a vehicle such as dextrin or gum arabic and then dry it by means of, for example, vacuum drying at lowered temperature. Alternatively, the distillate may also be introduced into the crystal structure of some crystalline substance capable of holding crystal water, such as anhydrous lactose, to replace the crystal water.

The flavor substance can be taken out as a distillate from the reaction product by some conventional method such as steam distillation or organic solvent vapor distillation (distillation with vapor of organic solvent). When steam distillation is adopted, a distillate containing beef flavor can be isolated from the reaction product by blowing steam, air or nitrogen gas into the latter while heating it to 60° to 140° C. The distilling vapor can be collected by cooling at 20° to −86° C and condensing it or by introducing it into cooled ethanol to give a solution. When organic solvent vapor distillation is adopted, a distillate containing beef flavor can be isolated by blowing vapor of an organic solvent such as ethanol into the reaction product while heating the latter to 60° to 140° C under a reduced pressure of 2 – 5 mm Hg. The distilling vapor mixture, composed of ethanol and a flavor component arising from the reaction product, can be collected by intensely cooling it to −70° to −86° C.

The distillate of beef flavor substance thus obtained was analyzed by means of gas chromatography in comparison with volatile components of the starting materials, namely the volatile components of heat-treated beef tallow and koikuchi soy sauce. The gas chromatogram given by the beef flavor substance of this invention was entirely different from any of the chromatograms given by the soy sauce flavor and the volatile component of heat-treated beef tallow. This means that here is obtained a new flavor substance having new properties and new chemical composition through the reaction between beef tallow and soy sauce.

As above, the distillate itself of the beef flavor substance obtained according to the process of this invention, a product prepared by incorporating said distillate with a vehicle such as dextrin or gum arabic and then drying it by means of vacuum drying at lowered temperature, and a product prepared by thoroughly kneading anhydrous lactose with said distillate to introduce the distillate into the crystalline structure of lactose in place of crystal water and then shaping the kneaded mixture into powder or flake are all effective as a flavoring agent or flavor-improving agent for meat substitutes composed of fish meat protein, gluten, soybean protein or the like as well as various drinks, foods, seasonings, spices, soup essences and the like into which a meat flavor should be incorporated.

Referring to examples, this invention will be illustrated below in more detail.

EXAMPLE 1

Into a flask of 500 ml capacity was placed 70 g of a refined beef tallow. It was heated under reflux at 160° C for 40 minutes while introducing air at a rate of 2.5 l/minute for the sake of stirring. The heat-treated beef tallow thus obtained was mixed with 40 ml of koikuchi soy sauce. The resulting mixture was heated under reflux at 160° C for 10 minutes while introducing air for the sake of stirring. After cooling, it was thoroughly homogenized to give an excellent paste of roast beef flavor substance.

EXAMPLE 2

The procedure of Example 1 was repeated except that the 70 g of refined beef tallow was replaced by 70 g of lard. Thus, an excellent paste of roast beef flavor substance was obtained.

EXAMPLE 3

The procedure of Example 1 was repeated except that the 40 ml of koikuchi soy sauce was replaced by 40 ml of usukuchi soy sauce. Thus, an excellent paste of roast beef flavor substance was obtained.

EXAMPLE 4

In a flask of 500 ml capacity, 70 g of commercially available lard was heated under reflux at 160° C for 1 hour while introducing air at a rate of 1-3 l/minute for the sake of stirring. The heat-treated lard was mixed with 30 ml of koikuchi soy sauce and the resulting mixture was heated under reflux at 160° C for 10 minutes while introducing air for the sake of stirring, whereby a liquid reaction mixture having an excellent flavor of roast beef was obtained.

The reaction mixture was placed in a distillation flask of 500 ml capacity and heated in an oil bath kept at 120° C while introducing nitrogen gas into the mixture. The distilling vapor was collected by introducing it into 30 ml of cooled ethanol for 30 minutes. Thus, there was obtained a quite excellent roast beef flavoring agent.

EXAMPLE 5

100 g of commercially available refined beef tallow was placed in a 500 ml flask and heated under reflux at 180° C for 1 hour while introducing air at a rate of 1 - 3 l/minute for the sake of stirring. The heat-treated beef tallow was mixed with 50 ml of koikuchi soy sauce and the resulting mixture was heated under reflux at 170° C for 20 minutes while introducing air for the sake of stirring. The reaction product thus obtained was transferred to a distillation flask of 500 ml capacity and heated to 80° C, into which was blown ethanol vapor at a reduced pressure of 2-3 mm Hg to effect an ethanol vapor distillation. The distilling vapor was cooled to about −80° C and condensed to give a strong roast beef flavoring agent.

Using the beef flavoring agent thus obtained and a commercially available beef essence produced from natural beef, the compositions of the following Table 3 were prepared. They were heated to 100° C to give the corresponding soups. The both soups were tested on distinguishability of flavor by a panel of 20 persons. All the persons made a judgement that both the soups were quite close in flavor. This evidences that the roast beef flavor substance of this invention is identical in quality with the flavor of natural beef essence and considerably advantageous over the latter in the respect of quantity.

Table 3

| | | |
|---|---|---|
| Water | 1 l | 1 l |
| Beef essence | 10 g | — |
| Beef flavor substance of this invention | — | 3 g |
| Edible salt | 7.5 g | 7.5 g |
| Soy sauce | 15 ml | 15 ml |

EXAMPLE 6

20 ml of the ethanolic solution of roast beef flavor which had been prepared in Example 5 by means of ethanol vapor distillation under reduced pressure was blended with 50 g of anhydrous lactose for 2 hours. Thus, there was obtained a white, powdery, roast beef flavoring agent.

What is claimed is:

1. A beef flavor substance which is prepared by mixing 1 part by weight of an animal fat with 0.1 to 1.5 parts by weight of a brewed soy sauce, and reacting the resulting mixture at 130° to 220° C. for 5 to 30 minutes.

2. A beef flavor substance according to claim 1, wherein said animal fat is heated and fused in advance under aerobic conditions at 130° to 220° C. for 5 to 30 minutes.

3. A beef flavor substance according to claim 1, wherein the reaction of said animal fat and said brewed soy sauce is carried out under aerobic conditions.

4. A beef flavor substance according to claim 1, wherein the animal fat is a beef tallow, lard, mutton tallow, goat tallow, or whale tallow.

5. A beef flavor substance according to claim 2, wherein the aerobic condition is that air or oxygen is introduced.

6. A beef flavor substance according to claim 5, wherein said air is introduced at a rate of 0.4 l/minute or more per 50 g of said animal fat.

7. A process for preparing a beef flavor substance which comprises mixing 1 part by weight of an animal fat with 0.1 to 1.5 parts by weight of a brewed soy sauce, and reacting the resulting mixture at 130° to 220° C. for 5 to 30 minutes.

8. A beef-flavoring agent wherein the main component is a distillate itself or a mixture of a distillate and a vehicle, said distillate being obtained by mixing 1 part by weight of an animal fat with 0.1 to 1.5 parts by weight of a brewed soy sauce, reacting the resulting mixture at 130° to 220° C. for 5 to 30 minutes, and then distilling the reacted mixture with steam or with vapor of an organic solvent.

9. A beef-flavoring agent according to claim 8, wherein the vehicle is dextrin, gum arabic or anhydrous lactose.

10. A beef-flavoring agent according to claim 8, wherein the organic solvent is ethanol.

11. A beef-flavoring agent according to claim 8, wherein said animal fat is heated and fused in advance under aerobic conditions at 130° to 200° C. for 20 to 180 minutes.

12. A beef-flavoring agent according to claim 8, wherein the reaction of said animal fat and said brewed soy sauce is carried out under aerobic conditions.

13. A beef-flavoring agent according to claim 8, wherein the animal fat is a beef tallow, lard, mutton tallow, or whale tallow.

14. A beef-flavoring agent according to claim 11, wherein the aerobic condition is that air or oxygen is introduced.

15. A beef-flavoring agent according to claim 14, wherein said air is introduced at a rate of 0.4 1/minute or more per 50 g of said animal fat.

16. A beef-flavoring agent according to claim 8, wherein the distillation with steam is carried out in that a distillate containing beef flavor is isolated from the reaction product by blowing steam, air or nitrogen gas into the reaction product while heating the reaction product to 60° to 140° C., and then collected by cooling at 20° to −86° C. to condense the distillate or by introducing the distillate into cooled ethanol to give a solution.

17. A beef-flavoring agent according to claim 8, wherein the distillation with a vapor of an organic solvent is carried out in that a distillate containing beef flavor is isolated from the reaction product by blowing vapor of an organic solvent into the reaction product while heating the reaction product to 60° to 140° C under a pressure of 2 - 5 mmHg and then collected by cooling it to −70° to −86° C.

* * * * *